July 9, 1929. A. J. WHELAN 1,720,502

TWINE CUTTER

Filed Jan. 31, 1927

Augustin J. Whelan
INVENTOR

BY Victor J. Evans
ATTORNEY

WITNESS:

Patented July 9, 1929.

1,720,502

UNITED STATES PATENT OFFICE.

AUGUSTIN J. WHELAN, OF JERSEY CITY, NEW JERSEY.

TWINE CUTTER.

Application filed January 31, 1927. Serial No. 164,903.

This invention relates to improvements in twine cutters.

The primary object of the invention resides in a portable twine cutter which may be placed on the counter of a store and used by the clerks for cutting the twine used in wrapping packages by merely passing the twine thereover, it being appreciated that at present it is a common practice to wrap the twine about one's hand and to break the same which results sometimes in injury to the person so doing.

Another object of the invention is to provide a twine cutter in which old safety razor blades may be used as the cutting knife.

Another object is to provide a twine cutter with a novel form of tension means for preventing the twine from accidentally paying out from the spool or ball when a pull is exerted upon the free end thereof.

A further object is the provision of a twine cutter which is simple in construction, inexpensive of manufacture and highly efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
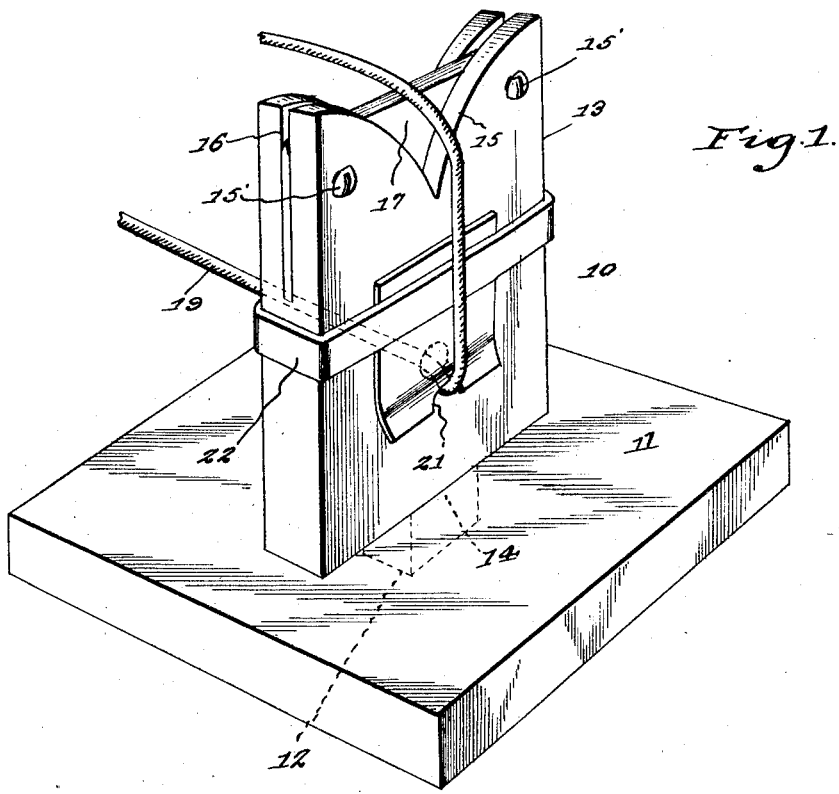
Figure 1 is a perspective view of my invention.
Figure 2:
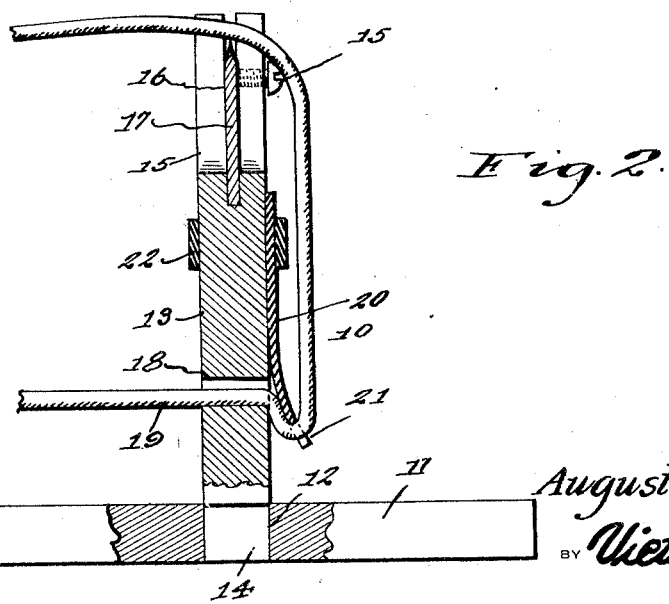
Figure 2 is a vertical longitudinal sectional view therethrough.

Referring more particularly to the drawing, the reference numeral 10 designates my improved twine cutter in its entirety and which includes a flat base 11 having a square socket or opening 12 provided centrally thereof. The base serves as a support for a holder 13 provided with a tongue 14 for frictional engagement with the walls of the socket 12 for supporting the holder vertically upon said base. The top of the holder is provided with a V-shaped crotch 15 and is slotted as at 16 to receive a knife blade 17. The blade 17 may be a discarded safety razor blade and is held in the holder against movement by clamping screws 15' in a manner so that the knife edge of the blade is exposed in the crotch 15.

The holder 13 is provided with a horizontally disposed opening 18 below the crotch and which acts as a guide for the cord or twine 19. To prevent accidental paying out of the twine, I mount a rubber flap 20 on one of the side faces of the holder and which extends down to cover the opening 18. The lower edge of the flap is provided with a notch 21 for receiving the twine after it passes through the opening 18. The flap 20 is held upon the holder by a metal band or strap 22 which passes around the holder and tightly clamps the flap thereagainst. It will be understood that the normal tendency of the flap is to lie flat against the holder, which in turn presses the twine against the holder and places a slight tension thereon, so that the free end of the twine will not easily pull through the opening 18. This prevents unwinding of the twine at a speed greater than is necessary when using the twine for wrapping purposes.

In the use of the device, the twine is pulled through the guide opening 18 as the same is wound upon the package being wrapped, or is pulled to the desired length after which the twine is brought up and over the knife blade 17 as indicated in Figure 1 where it is severed.

From the foregoing description, it will be seen that I have provided a portable twine cutter which may be moved about the counter or table for the convenience of the clerks in a store, and which if desired may be mounted on the twine holder bracket in spaced relation to the spool or ball of twine.

What is claimed as new is:—

1. A twine cutter comprising a holder having a V-shaped crotch provided therein, a knife blade supported in said holder with its cutting edge exposed in said V-shaped crotch, a guide opening provided in said holder for the passage of the free end of a piece of twine, and a flexible flap overlying one side of said opening with its free end edge extending away from the cutting edge of the knife blade for placing a slight tension on the free end of the twine as it passes through said guide opening.

2. A twine cutter comprising a base, a holder rising from said base, and having a crotch provided therein, a slot provided in said holder, a knife blade seated within said slot with its cutting edge exposed in said crotch, said holder having a guide opening provided therein, and a flexible flap member overlying said guide opening with its free end edge extending away from the cutting edge of the knife blade for setting up a tension on the twine as it passes from said opening.

3. A twine cutter comprising a holder, a knife blade supported by said holder with its cutting edge exposed, said holder having a guide opening therein for the passage of the free end of a piece of twine, and a flexible tension member supported by said holder and overlying said guide opening with its free end edge extending in a direction away from the cutting edge of said knife blade.

In testimony whereof I have affixed my signature.

AUGUSTIN J. WHELAN.